C. P. BONFOEY.
Snap-Hook.

No. 203,238.  Patented May 7, 1878.

Witnesses.  Inventor
Geo. R. Javett  Clarence P. Bonfoey
John P. Peters  by Theo. G. Ellis, Attorney

UNITED STATES PATENT OFFICE.

CLARENCE P. BONFOEY, OF MIDDLETOWN, CONNECTICUT, ASSIGNOR TO EMMA GERTRUDE BONFOEY, OF SAME PLACE.

IMPROVEMENT IN SNAP-HOOKS.

Specification forming part of Letters Patent No. 203,238, dated May 7, 1878; application filed February 5, 1878.

*To all whom it may concern:*

Be it known that I, CLARENCE P. BONFOEY, of Middletown, in the county of Middlesex and State of Connecticut, have invented certain new and useful Improvements in Snap-Hooks; and I do hereby declare that the following is a full, clear, and exact description thereof, whereby a person skilled in the art can make and use the same, reference being had to the accompanying drawing, and to the letters of reference marked thereon.

Like letters in the figures indicate the same parts.

My improvement relates to spring snap-hooks, such as are usually used upon a hitch-line to hook into the ring of a horse's bit, and for other similar purposes.

The object of my invention is to provide a better, simpler, and stronger snap-hook than has heretofore been in use.

My invention consists in the construction and arrangement of the several parts, as will be hereinafter described.

Figure 1:
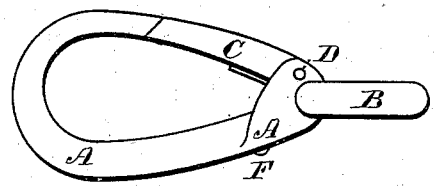
Figure 2:
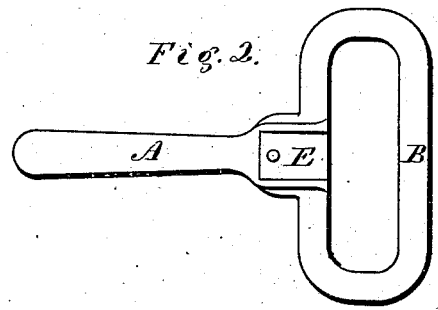
Figure 3:
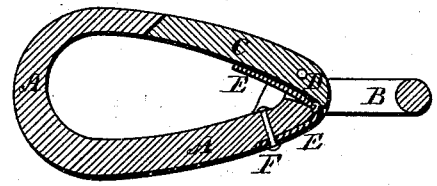

In the accompanying drawing, Figure 1 shows a side view of my improved snap-hook. Fig. 2 shows a view of the under side of the same. Fig. 3 is a longitudinal section through the middle of the hook, showing the peculiar arrangement of the spring.

A is the curved part, forming the hook. B is the loop, through which the strap is attached in the usual manner. The parts A and B are commonly made solid in one piece. C is the tongue, which yields to allow the bit of a horse or any other object to enter the hook. Its end is inclined, or of such other suitable form as will allow the tongue to yield inwardly, but which stops it against the end of the hook when pressed outwardly. The rear end of the tongue fits into a socket in the shank A, and is secured by the pin or rivet D, upon which it turns.

E is a U-shaped spring, which is attached to the outer side of the shank A, as shown in the drawing, and curves around between the shank and the tongue C, so as to lie close along the under side of the tongue. This spring is let into a suitable socket in the shank, so as to lie flush with its surface, and is firmly held in its position by means of a rivet, F, and by the sides of the socket.

By means of my improvement the spring is placed out of the way, so as to leave an unobstructed space within the hook, thereby allowing it to be made smaller for the same capacity and strength, and at the same time permitting the use of a strong leaf-spring, which shall efficiently close the tongue and prevent its being accidentally forced open.

I am aware that U-shaped springs have been before used in snap-hooks; but they have been placed inside of the shank, where they were obliged to be sunk into a recess formed to receive the lower end.

By means of my improvement the spring is so situated that it has a bearing over the rear end of the shank, whereby greater strength and stiffness are gained with less danger of breaking, and also leaves no opening for the accumulation of dirt.

What I claim as my invention is—

The spring E, of the form described, in combination with the shank A and the hinged tongue C, when attached to the outer side of the shank and operating upon the inner side of the tongue, substantially as herein set forth.

CLARENCE P. BONFOEY.

Witnesses:
    THEO. G. ELLIS,
    WILLARD EDDY.